US006578860B1

(12) United States Patent
Chang

(10) Patent No.: US 6,578,860 B1
(45) Date of Patent: Jun. 17, 2003

(54) DUAL FUNCTION WHEELCHAIR

(75) Inventor: Dean C. Chang, Anaheim Hills, CA (US)

(73) Assignee: Evermed, Anaheim, CA (US)

( * ) Notice: Subject to any disclaimer, the term of this patent is extended or adjusted under 35 U.S.C. 154(b) by 0 days.

(21) Appl. No.: 10/041,409

(22) Filed: Jan. 7, 2002

(51) Int. Cl.[7] .................................................. B62M 1/14

(52) U.S. Cl. ................................ 280/250.1; 280/242.1; 188/2 D; 188/2 F; 188/24.16; 188/24.21

(58) Field of Search ........................... 280/250.1, 304.1, 280/648, 650; 188/2 F, 2 D, 24.15, 24.16, 24.21

(56) References Cited

U.S. PATENT DOCUMENTS 4,098,521 A * 7/1978 Ferguson et al. ........... 280/247
4,362,311 A * 12/1982 Bergman ................. 280/250.1
4,570,756 A * 2/1986 Minnebraker et al. ...... 188/2 F
4,643,446 A * 2/1987 Murphy et al. ............... 180/11
4,759,418 A * 7/1988 Goldenfeld et al. ....... 180/65.1
4,768,622 A * 9/1988 Nicklasson et al. ......... 188/2 D
4,805,931 A * 2/1989 Slasor ..................... 280/250.1
4,962,942 A * 10/1990 Barnett et al. ............. 280/5.28
5,076,390 A * 12/1991 Haskins ................... 280/250.1
5,113,959 A * 5/1992 Mastov et al. ................ 180/11
5,188,383 A * 2/1993 Thompson ............... 280/250.1

* cited by examiner

*Primary Examiner*—Lesley D. Morris
*Assistant Examiner*—Daniel Yeagley

(57) ABSTRACT

The present invention implements a releasable wheel mounting mechanism and a dual braking system to provide a wheelchair that transforms from a conventional wheelchair to a companion wheelchair. A set of small rear wheels traditionally found on a companion wheelchair is mounted on the rear of the chair, along with a means for removably mounting a set of large wheels. When the large wheels are removed, the chair reverts to a companion chair having handles on the rear of the chair for steering by a second person. With the large wheels mounted on the chair, the chair serves as a conventional wheelchair capable of being steered and propelled by the chair's occupant. To enable the dual nature of the chair, the present invention employs a braking system that allows the chair to be stopped by the occupant in either mode. A mechanical lever system applies a braking force to the large wheels when the chair is in the conventional mode, and a cable connection allows the same lever to actuate a similar braking operation on the small wheels in the companion mode.

8 Claims, 2 Drawing Sheets

DUAL FUNCTION WHEELCHAIR

BACKGROUND OF THE INVENTION

1. Field of the Invention

The present invention relates generally to wheelchairs, and in particular to a dual function wheelchair that serves as both a conventional wheelchair and a companion wheelchair.

2. Description of Related Art

Wheelchairs traditionally are categorized as being of one of two types: a conventional wheelchair, and a companion wheelchair. A conventional wheelchair has two large rear wheels that allow the occupant of the chair to propel himself by placing his hands on the two large wheels and rotating the large wheels. A companion wheelchair has two small rear wheels that do not allow the occupant to steer or propel the wheelchair. Instead, the companion wheelchair includes handles on the rear of the chair that permits a second person, or "companion," to push and steer the wheelchair. Companion wheelchairs, because they lack a large rear wheel, are easier to fold up and store away, and are used frequently when travel is required. Those who use a companion wheelchair are typically forced to purchase both types, unless one is never in need to drive one's own chair. There are many people that could benefit from a companion wheelchair, but cannot afford the expense of two wheelchairs and must make do with a conventional wheelchair.

SUMMARY OF THE INVENTION

The present invention implements a releasable wheel mounting mechanism and a dual braking system to provide a wheelchair that transforms from a conventional wheelchair to a companion wheelchair. A set of small rear wheels traditionally found on a companion wheelchair is mounted on the rear of the chair, along with a means for removably mounting a set of large wheels. When the large wheels are removed, the chair reverts to a companion chair having handles on the rear of the chair for steering by a second person. With the large wheels mounted on the chair, the chair serves as a conventional wheelchair capable of being steered and propelled by the chair's occupant. To enable the dual nature of the chair, the present invention employs a braking system that allows the chair to be stopped by the occupant in either mode. A mechanical lever system applies a braking force to the large wheels when the chair is in the conventional mode, and a cable connection allows the same lever to actuate a similar braking operation on the small wheels in the companion mode. Thus, the present invention provides a wheelchair that easily converts from a companion mode to a conventional mode and offers a unique single lever braking system that operates in both modes.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a dual finction wheelchair with a single actuator braking system.

Figure 1:
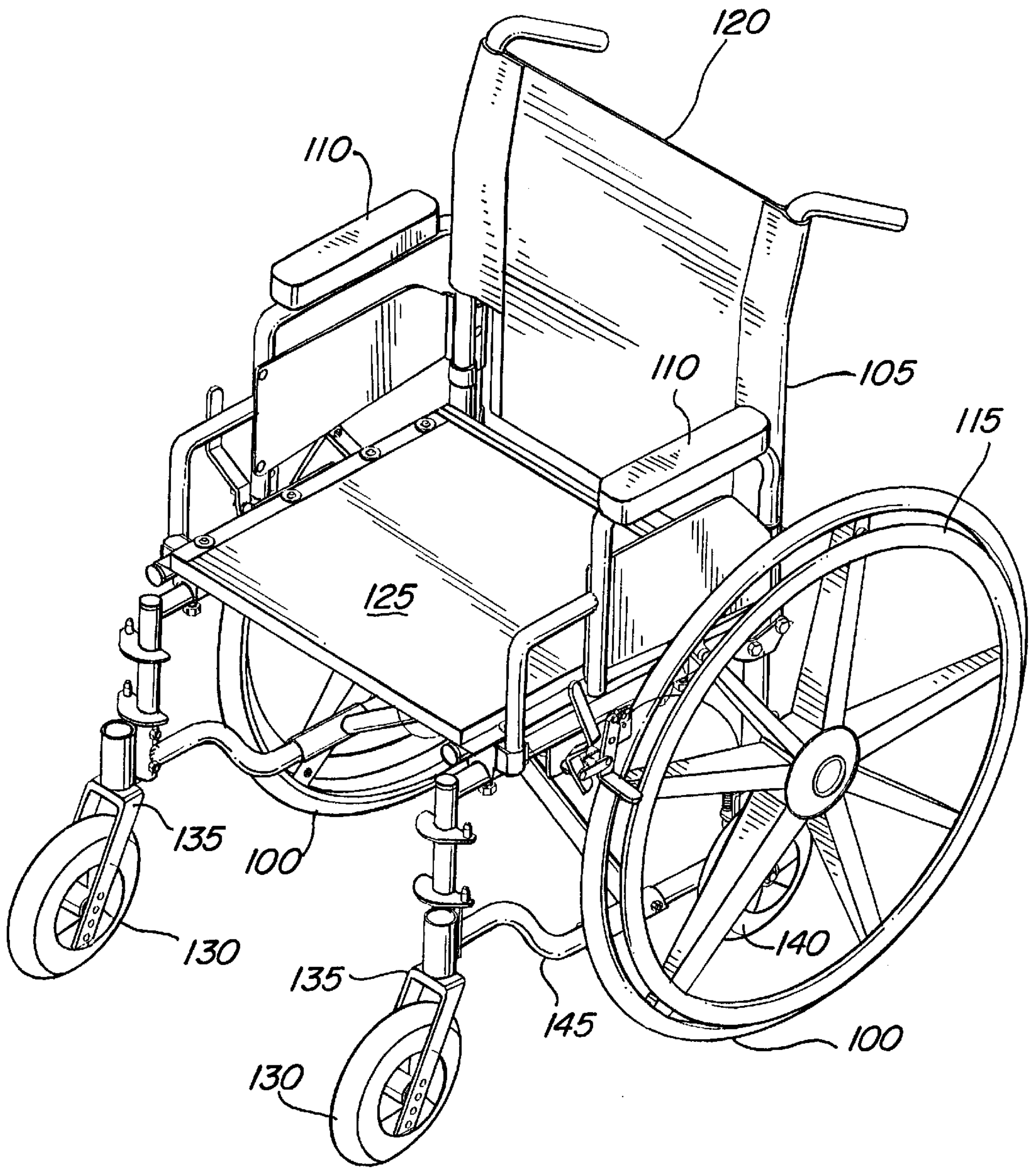
FIG. 1 is an elevated perspective view of a preferred embodiment of the present invention showing the invention in "conventional" mode.

FIG. 1 is an elevated perspective view of the present invention in its conventional mode. That is, two large rear wheels 100 are mounted on the chair 105 that allow the occupant of the chair to reach over the armrests 110 and grasp the wheels' rim 115 and push on the wheels 100. Pushing both wheels at once causes the wheelchair 105 to move forward in a well known manner, while moving the left or right wheel more than the other will cause the wheelchair to turn. Other components of the wheelchair, such as the back support 120, seat 125, front wheels 130, and front wheel supports 135 are conventional components that do not require further elaboration for an understanding of the present invention.

FIG. 1 also illustrates a second set of rear wheels 140 that are of similar diameter and size to the front wheels 130, as is typical of companion wheelchairs. The small rear wheels 140 are supported on the frame 145 of the wheelchair 105 at rear brackets 150. It is contemplated that the small rear wheels 140 remain attached to the wheel chair 105 while the present invention is operating in either mode, since the large wheels 100 may be position to be either redundant with the small wheels 140 (i.e., mutually touching the ground) or they may elevate the small wheels 140 slightly off the ground during operation in the conventional mode.

Figure 2:
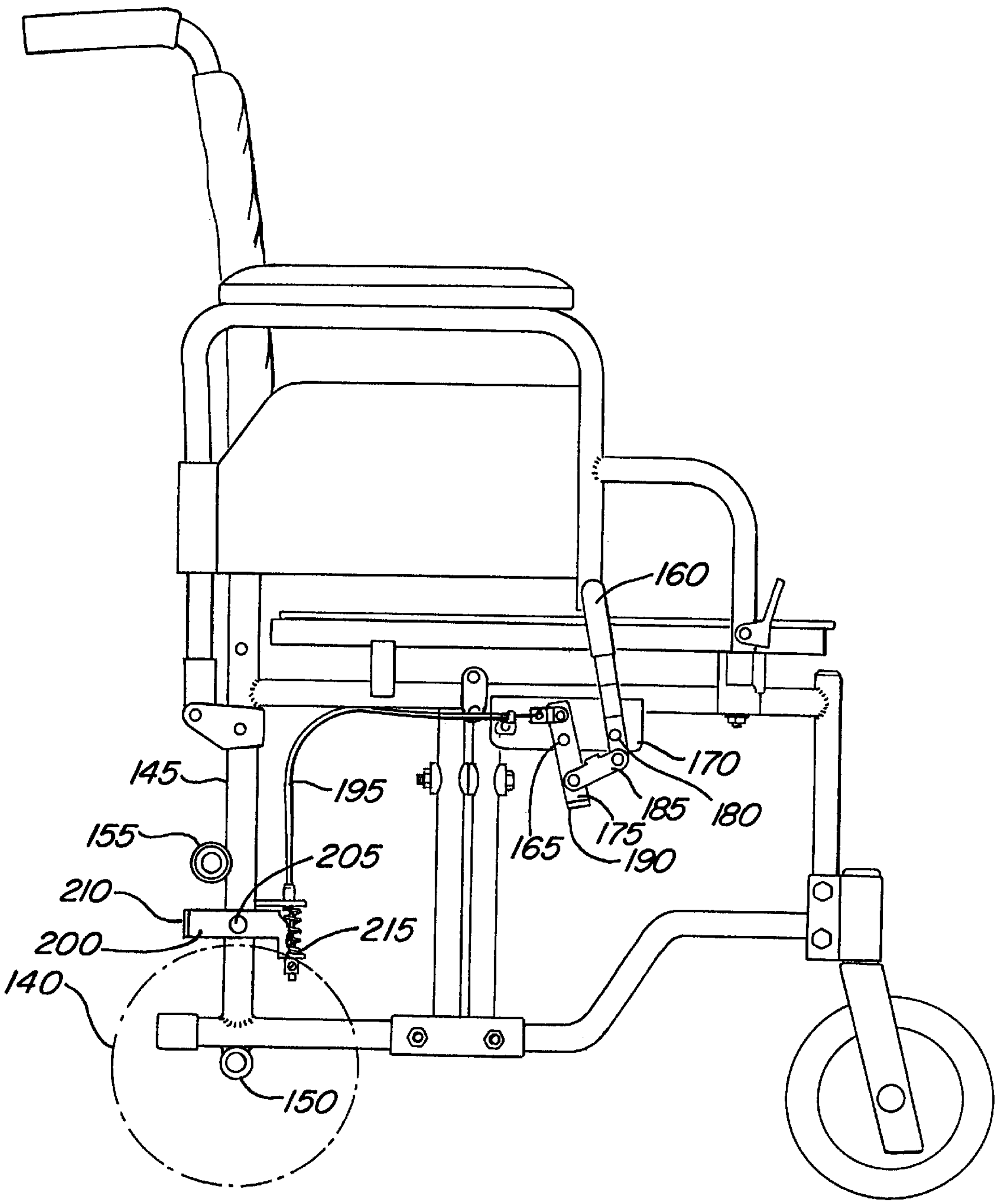
FIG. 2 is a side view of a preferred embodiment of the present invention showing the invention in "companion" mode.

FIG. 2 is a side view of the present invention shown in the companion mode. The large rear wheels 100 have been removed and the small rear wheels 140, along with the small front wheels 130, form the rolling mode for the chair. A cylindrical mounting slot 155 on each side of the frame 145 provides a mounting location for the large wheels 100. The large wheels 100 may be secured with a threaded member such as a bolt that engages with a threaded portion of the slot 155, or the wheel may be secured with another quick-release mechanisms. The nature of the connection of the large wheel requires only that the wheel be securely fastened when in operation without unduly hindering the rotation of the wheel with surplus friction that would hinder the operation of the chair, while allowing the wheel to be removed without undo effort.

FIG. 2 further illustrates a unique braking mechanism that permits the occupant of the chair to decelerate or hold stationary the wheelchair using a hand-operated braking system in either the conventional or the companion mode. A braking lever 160 positioned at the forward portion of the frame 145 near each hand is shaped to permit easy grasping by a user and pivots forward and backward via a pin 180 that secures a braking lever 160 to a bracket 170. A second pivoting member 175 is mounted adjacent the braking lever 160 by a pin by a pin 165. The rotation of the braking lever 160 is coupled to the rotation of the second pivoting member 175 by a connecting bar 185, such that a rotation of the braking lever 160 in the clockwise direction causes a corresponding rotation of the second pivoting member 175 in the same direction. As explained below, the rotation of the second pivoting member 175 causes a contact member to apply direct pressure to the rear wheels of the chair, whether the chair is operating in conventional or companion mode.

When the chair 105 is operating in conventional mode, a lateral projection 190 on the second pivoting brake member 175 normally resides adjacent to the large rear wheel 100. In this position, the wheel turns unhindered by the lateral projection 190. However, when the braking lever 160 is pivoted forward the second pivoting brake member 175 rotates in a manner that moves the lateral projection 190 into the path of the rear wheel 100, causing contact with the wheel. The more force that is applied to the braking lever 160 by the user, the greater the force of the lateral projection 190 on the wheel 100, until the wheel is either brought to a complete stop, or prevented from rotating (as may be necessary on an inclined surface). If the braking lever 160 is pivoted backward, the lateral projection 190 is retracted thereby releasing the rear wheel 100. In this manner, the wheelchair 105 is braked while in the conventional mode.

The second pivoting brake member 175 is also connected to a cable 195 having an outer sheath mounted on the bracket 170. Moving the braking lever 160, and the accompanying movement of the second pivoting brake member 175, causes the cable 195 to be pulled through the sheath. The opposite end of the cable 195 is connected to a first pivoting brake 200 mounted adjacent the small rear wheel 140. A spring 215 is provided to bias the first pivoting brake 200 in a non-contact position. However, when the cable 195 is actuated by the braking lever 160 the portion of the first pivoting brake 200 is rotated by the cable 195, causing a complementary movement of the other end of the first pivoting brake 200 through the pivot pin 205. The end of the first pivoting brake 200 includes a lateral projection 210 that contacts the small rear wheel 140 when the first pivoting brake 200 is actuated. The spring 215 returns the first pivoting brake 200 to the non-contact position when the force is removed from the braking lever 160.

As can be appreciated, the wheelchair of the present invention converts easily and rapidly from a conventional wheelchair to a companion wheelchair by simply removing the large wheels that provide the occupant with a mode of propulsion. To facilitate the transition between the two modes, a braking system has been developed that operates in either mode to arrest the motion of the wheelchair or prevent the wheelchair from moving while the brake is set. The present invention solves the problem encountered by those who would like to own both a conventional wheelchair and a companion wheelchair without having to purchase two separate wheelchairs.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A wheelchair having a set of front wheels and a first set of rear wheels generally having the same diameter as the set of front wheels operatively attached to a frame, and further comprising a second set of rear wheels having a diameter substantially larger than the first set of rear wheels, the first and second set of rear wheels are both rotatably attached to the frame for simultaneous movement with the wheelchair, the second set of rear wheels is removable mounted on said wheelchair, whereby the wheelchair is configured as a companion wheelchair further comprising a braking system for applying a bracking contact to both the first set of rear wheels and the second set of rear wheels, the braking stem actuated by a lever mounted on the wheelchair.

2. The wheelchair of claim 1 wherein the braking system comprises a first pivoting member coupled to said lever for applying direct pressure to said second set of rear wheels, and a cable connected to the first pivoting member for controlling a second pivoting member that applies direct pressure to said first set of rear wheels.

3. The wheelchair of claim 2 wherein the braking system further comprises a spring to bias the second pivoting member in a non-braking condition.

4. A convertible wheelchair having a frame unit for supporting a seat comprising, a pair of front wheels operatively connected to the frame unit, a first set of rear wheels operatively connected to the frame unit, a second set of rear wheels, larger in diameter than the first set of rear wheels, is operatively connected to the frame unit and removably connected to the frame unit; and a braking system operatively connected to the frame unit having a handle unit positioned on the frame unit for grasping by the user, a first brake member for contact with the first set of rear wheels and a second brake member for contact with the second set of rear wheels, whereby moving the handle unit simultaneously applies the first brake member to the first set of rear wheels and the second brake member to the second set of rear wheels, when the second set of rear wheels are mounted on the frame unit.

5. The convertible wheelchair of claim 4 wherein the first brake member is pivotally connected to the handle unit and the second brake member is connected to the first brake member by a cable, the second brake member is pivotally connected to the frame unit.

6. The convertible wheelchair of claim 5 wherein the braking system further comprises a spring member to bias the second brake member to a non-braking condition.

7. The convertible wheelchair of claim 6 wherein the pair of front wheels and the first set of rear wheels have approximately the same diameters.

8. The convertible wheelchair of claim 5 wherein the handle unit includes a lever pivotally mounted on the frame unit, one end of the lever is configured for grasping by a user and the other end is pivotally attached to a connecting bar with the pivotally mounting of the lever on the frame unit positioned between the respective ends of the lever, the connecting bar is pivotally mounted to the second brake member at one end of the second brake member and the cable is connected at the other end of the second brake member, the cable is spring mounted to the first brake member to bias the first brake member away from the first set of rear wheels.

* * * * *